US012187003B2

(12) United States Patent
Spiesshofer et al.

(10) Patent No.: US 12,187,003 B2
(45) Date of Patent: Jan. 7, 2025

(54) SYSTEM OF A FRAME FOR PRESSES

(71) Applicant: AIDA EUROPE GmbH, Weingarten (DE)

(72) Inventors: Thomas Spiesshofer, Bermatingen (DE); Anett Pfohl, Ravensburg (DE); Anton Lendler, Weingarten (DE); Elmar Weber, Ostrach (DE)

(73) Assignee: AIDA EUROPE GMBH, Weingarten (DE)

( * ) Notice: Subject to any disclaimer, the term of this patent is extended or adjusted under 35 U.S.C. 154(b) by 728 days.

(21) Appl. No.: 17/432,914

(22) PCT Filed: Feb. 8, 2020

(86) PCT No.: PCT/DE2020/100083
§ 371 (c)(1),
(2) Date: Dec. 27, 2021

(87) PCT Pub. No.: WO2020/169146
PCT Pub. Date: Aug. 27, 2020

(65) Prior Publication Data

US 2022/0194041 A1 Jun. 23, 2022

(30) Foreign Application Priority Data

Feb. 23, 2019 (DE) ..................... 10 2019 001 285.2

(51) Int. Cl.
*B30B 15/04* (2006.01)
*B21J 13/04* (2006.01)
*B30B 15/28* (2006.01)

(52) U.S. Cl.
CPC ............ *B30B 15/04* (2013.01); *B30B 15/281* (2013.01); *B21J 13/04* (2013.01)

(58) Field of Classification Search
CPC ....... B30B 15/14; B30B 15/28; B30B 15/281; B30B 15/04; B30B 15/042; B30B 15/044;
(Continued)

(56) References Cited

U.S. PATENT DOCUMENTS 4,615,208 A * 10/1986 Hailey ................ B30B 15/0052
72/453.01
5,394,723 A 3/1995 Benz
(Continued)

FOREIGN PATENT DOCUMENTS

CA 2511317 C * 10/2009 ............... B27N 3/20
CN 2500469 Y 7/2002
(Continued)

OTHER PUBLICATIONS

English translation of DE 19704776A1 (6 pages). (Year: 2024).*
International Search Report, PCT/DE2018/000238, mailed Aug. 14, 2020.

*Primary Examiner* — Jimmy T Nguyen

(57) ABSTRACT

A system of a separable frame for presses and press frames (1), the respective press frame (1) comprising uprights (2) and a head piece as an upper cross connection (3) and a press table as a lower cross connection (4), which as structural units form a closed frame that absorbs static and dynamic forces for any required functions of a press such as the drive of a ram used for forming with tools. The uprights (2) are attachable laterally or longitudinally to the cross connections (3, 4) by non-positive or non-positive and positive joining geometries (5) and releasable connector (5.1). The proposed press frames (1) have a reduced vertical deflection (v2) compared to press frames joined by tie rod bracing (6).

23 Claims, 6 Drawing Sheets

(58) Field of Classification Search
CPC ........ B30B 15/045; B21J 13/04; B21B 31/02; B21D 37/10; F16M 1/00
USPC ........................................ 100/267.17; 72/455
See application file for complete search history.

(56) References Cited

U.S. PATENT DOCUMENTS

| | | | | |
|---|---|---|---|---|
| 6,865,984 | B2 * | 3/2005 | Schurmann | B30B 15/048 100/194 |
| 6,871,587 | B2 * | 3/2005 | Kanamaru | B30B 15/048 72/455 |

FOREIGN PATENT DOCUMENTS

| | | | |
|---|---|---|---|
| CN | 201264376 | Y | 7/2009 |
| CN | 201394915 | Y | 2/2010 |
| CN | 202045910 | U | 11/2011 |
| CN | 203974121 | U | 12/2014 |
| CN | 104438849 | A | 3/2015 |
| CN | 206011322 | U | 3/2017 |
| CN | 108712937 | A | 10/2018 |
| DE | 919031 | C | 10/1954 |
| DE | 1938279 | A | 10/1970 |
| DE | 2239147 | A | 2/1974 |
| DE | 2258655 | A1 | 6/1974 |
| DE | 2818511 | C2 | 10/1978 |
| DE | 3007975 | C2 | 1/1981 |
| DE | 4239641 | A1 | 6/1994 |
| DE | 19704776 | A1 | 8/1998 |
| DE | 10344635 | A1 | 5/2005 |
| DE | 102013108299 | B4 | 2/2015 |
| EP | 262593 | B1 | 4/1988 |
| GB | 1310433 | | 3/1973 |
| GB | 2070510 | A | 9/1981 |
| JP | S5135776 | U | 3/1976 |
| JP | S53118093 | A | 10/1978 |
| JP | S6118811 | U | 1/1986 |
| JP | H08118094 | A | 5/1996 |
| JP | H08197296 | A | 8/1996 |
| JP | H10314996 | A | 12/1998 |
| JP | 11197894 | A | 7/1999 |
| JP | 2000042797 | A1 | 2/2000 |
| JP | 2000343297 | A | 12/2000 |
| JP | 2001079696 | A | 3/2001 |
| JP | 2001087899 | A | 4/2001 |
| JP | 2003230993 | A | 8/2003 |
| JP | 2003320500 | A | 11/2003 |
| JP | 2005279747 | A | 10/2005 |
| JP | 2016022526 | A | 2/2016 |
| JP | 6013546 | B1 | 10/2016 |
| JP | H06143000 | A | 5/2024 |
| WO | 2009064500 | A1 | 5/2009 |

* cited by examiner

SYSTEM OF A FRAME FOR PRESSES

This is an application filed under 35 USC § 371 of PCT/DE2020/100083, filed on Feb. 8, 2020, which claims priority to DE 10 2019 001 285.2 filed on Feb. 23, 2019, which are both incorporated herein by reference in its entirety.

BACKGROUND OF THE INVENTION

(1) Field of the Invention

The invention relates to a system of a separable frame for presses and accordingly constructed press frames, wherein the respective press frame includes uprights and head piece as an upper cross-connection and a press table as a lower cross-connection which form as structural units a closed frame receiving static and dynamic forces for any necessary functions of a press, such as driving a ram for shaping using tools. Such frame-like press frames, also referred to as O-shaped press frames, are suitable for presses of all sizes and types and differ among other things depending on their design as a two-column presses and as a column design with four columns or in multi-ram presses as “two plus two times the number of ram”-columns.

The invention also relates to a computer program and a control and regulating device for the system of the press frame.

(2) Description of Related Art

DE 102013108299 B4 describes a press frame together with a method for assembling the same and a press. In particular for a forging press, this press frame has an upper beam, also referred to as head piece, and a lower beam as a lower cross-connection with uprights arranged between upper beam and the lower beam. The upper and lower beams are braced against each other with tie rods, with the uprights being interposed.

The development of such O-shaped press frames can be traced from a one-piece frame made of cast iron to a multi-piece frame made of welded structural units. On the one hand, those press frames were already designed to be horizontally separable in order to be able to bypass the transitions (radii) between the head piece (upper beam) and lateral stands (uprights), which are critical in terms of strength and tension in the originally cast frame. On the other hand, monobloc frames made of cast material were then already braced with tie rods when the material properties of the casting material, for example with regard to the primary stiffness of the press to be achieved, needed to be compensated and/or improved.

In particular in the case of forming, cutting or punching presses, such or similarly constructed press frames have to accommodate rotary or translational drives for rams that perform lifting motions and are equipped with upper tools and act against tables having lower tools.

As frames of this type, the press frames are to be designed commensurate with the complex operating forces. This applies to all press frames used, for example, for the species single press, transfer presses, press lines, multi-ram presses, multiple-die presses.

To absorb these complex forces, press frame constructions have been developed where the interposed uprights are prestressed with tie rods against the upper cross-connection (such as the head piece) and the lower cross-connection (such as the press table).

In order to be able to control the forces caused by the working pressure and acting on the machine body, heavy presses have increasingly been equipped with tie rods, as documented, inter alia, in DE 1938279 A, DE 2239147 A, DE 2818511 C2, DE 3007975 C2 and EP 262 593 B1.

These tie rods are intended to prevent the loss of the prestressing force between the individual components as a result of the tensile load on the frame during, for example, a forming process, for example prevent the so-called lifting of the head piece from the uprights.

It is known that a residual clamping force of the tie rod connection and thus an overload protection of a conventional frame can be defined with sufficient accuracy by setting the prestress.

The reason for the use of tie rods is generally to influence elastic changes in shape such as the deflection and stresses in components of the machine system subject to complex loads.

A realization has emerged that the significant proportion of damage caused by dynamic loads in individual components of the press frame has to be countered.

Finally, this led to the conclusion to reduce the deflection of the press frame by preloading a tie rod.

However, the resulting effect, that the tension rod preload influences the static load and the residual clamping force, masked the problem of investigating significant parameters concerning the accuracy of the press and primarily the spring-back and dynamic loading of the press frame, which are decisive for the fatigue strength of a press and the useful value on the operator side.

In addition to the dynamic and static load criteria, the specialist and designer developing a press frame must also take the following into account:

- The press frame should be constructed so that the functionally important parts of the press, such as cross-members, uprights, pressure points, tie-rods, connecting rods, drive elements, such as gears, bearings, shafts, axles and motors must be transportable as whole or partially prefabricated building units.
- The external dimensions of selected parts must also be able to be accommodated within the typical container dimensions so as to enable cost-effective transport in containers worldwide.
- The welded parts must be designed in such a way that they can be easily manufactured using welding technology and also have a minimum of mechanical processing operations, such as for bores and surfaces to be joined, so that they can be inexpensively manufactured, have a small transport volume, and can be designed for easy assembly/disassembly.
- Realization of a balanced ratio of material or production costs to the elastic properties and the service life of the press.

Overall, logistically complex conditions have to be met in order to be able to assemble the heavy and large components with their associated high transport costs on-site without any problems and to be able to dismantle them for maintenance or repair, while saving time and material. In addition, preassembly of such components in a cost-saving manner should also be possible.

The generic press frames must therefore be constructed so that not only the parts that determine the function of a press are relevant, but also the structural units of the respective press frame as complete or partially pre-assembled units, can be initially transported worldwide after being produced in a factory in a cost-effective and space-optimized manner and then installed on-site at an operator's site to form a fully functioning press in a technologically favorable manner.

Lastly, the development of the workpieces to be processed into high-strength sheet metal and the increased complexity of the tools entail new demands on the presses.

According to JP2003320500 A, the following has been proposed for easy assembly of a frame structure for a press:

A separable upper and lower cross-connection, which forms a frame with the head piece body, the parts releasably connected at its ends and the vertical columns (uprights), In the head piece body, projections with connecting surfaces are formed which match recesses having connecting surfaces in these parts and enable the force flow in the press frame during operation, wherein the associated parts of the separable cross-connection are attached to one another via fasteners (screws or threaded rods) and compensating adjusting pieces are arranged between the projections and the recesses.

The separated uprights are braced against the upper and lower intermediate and vertically extended separation of the cross-connection with tie rods. The horizontal separation of the O-frame in the uprights is extended in the vertical separation in the headpiece body, resulting in shorter headpiece bodies, which are technologically and logistically advantageous.

Tests show that the objectionable damage in the prior art press frames caused by the press operation mainly occurred in the cross-connections and uprights, but not in the tie rods.

From a technological point of view, it is remarkable that the tie rods are made from high-quality forged materials and, due to the structural features (height of the upper cross-connection plus height of the columns plus height of the lower cross-connection plus height of the tie rod nuts), have a considerable length. This results in a specifically high expenditure of material and assembly costs. The press operator requires tall buildings with deep cellar pits to accommodate the overall height of the presses. Conversely, the uprights of the press frame can be made of less valuable materials in order to satisfy the welding production processes and a permanent absorption of the dynamic load.

The press frame, analyzed in this way with the focus on different aspects, can be described as follows:

Although tie rods and uprights are made of materials of different quality, they are inevitably subject to the same dynamic deformation in the press frame.

As high-quality and cost-intensive components of a press system, the tie rods must also be protected from damage caused by the press operation due to the enormous procurement and assembly costs; therefore, the tie rod connection (like an expansion screw connection) of the press frame is, on the one hand, to be designed with a correspondingly high prestress force or residual clamping force to protect against overloading or lifting of the components from one another. On the other hand, the cross-sectional areas of tie rods and the component cross-section must additionally be dimensioned with a certain minimum ratio so that a minimum quantity of material can be specified in order to achieve a durable solution.

Due to the high overall value of a press system (press plant) including the complex tools provided by the customer and cost-relevant downtimes in the event of repairs, the focus is on availability and safety as well as protection of the press system as well as of the tools, so that the press frame (manifested conservatively) is oversized due to the construction dictated by the tie rods, and the preload (=1.3 times the operating force) of the tie rod puts an additional static load on the columns or the surface pressure of the anchor nut on the head piece.

Overall, the professional world has thus accepted a design practice of joining the press frame of a press consisting of uprights and cross-connections that absorb the static and dynamic forces for any required press functions and tools in form of a closed frame by way of expensive tie rod bracing, in order to counteract the damaging proportions of dynamic loads in the columns and cross-connections.

In the automotive industry, efforts are being made to reduce moving masses, for example by increasing the use of aluminum materials or fiber composite materials. Alternatively, steel materials are still used. Since, however, weight savings can only be achieved with thinner starting materials and thus thinner components, the strength of the material must be increased in order to meet safety and strength aspects, namely by processing so-called high-strength sheet metal.

This places increased demands on forming machines such as presses with respect to accuracy parameters and required pressing forces.

Accordingly, the conventional design has to be reinforced both with respect to the cross-section of the tie rods and the cross-sections of a press frame or its uprights, which disadvantageously increases the cost of the press.

Further references are JP 2005-279 747 A, JP 2003-230 993 A, CN 2 500 469 Y, CN 201 394 915 Y, CN 202 045 910 U, WO 2009/064 500 A1, CN 201 264 376 Y or DE 103 44 635 A1.

BRIEF SUMMARY OF THE INVENTION

In order to be able to satisfy the problem of the higher pressing forces, the required accuracies and economic aspects, it is an object of the invention to create a press frame with controllable stress states resulting from the press operation, the components of which can in a technologically advantageous manner be joined to form a frame that absorbs the dynamically and statically acting forces, wherein the press frame has an increased fatigue strength and a reduced vertical elastic deflection according to velz while optimizing material use.

In this case, parts or structural units of a respective press frame should be transportable worldwide in a cost-effective and space-optimized manner as complete or partially prefabricated structural units after their manufacture, with technologically inexpensive on-site assembly into a fully functioning press.

Moreover, a computer program and a control and regulating device shall be created from the synergies resulting from the system of the press frame.

The combination of tie rod stiffness, column stiffness and stiffness of the cross-connections is important for the overall stiffness of the press frame forming the frame.

From the point of view of an expert, the deflection is to be considered more strictly as a distinctive accuracy parameter of the press, as it characterizes the maximum, vertical and elastic deformation of the frame during the press operation and is characteristic of the overall stiffness of the uprights that are braced with tie rods and screw connections.

The aforementioned stiffness is determined by the modulus of elasticity, the height of the components and the size of the effective cross-sections. It should be noted here that the selected steel material already has the highest modulus of elasticity of the materials under consideration, so that the modulus of elasticity can no longer be increased.

The component height of the press frame is, on the one hand, functionally determined by the geometry of the workpiece to be manufactured, and, on the other hand, physically determined by the dimensions of the components required to control and absorb the acting forces.

To improve the elastic properties of the press frame, the designers have only the option of affecting the dimensions of the cross sections and the associated cost through the use of the employed materials.

For an understanding of the invention and in accordance with the different press types specified at the beginning, a distinction should be made between the following arrangements of frames in a press frame:

A single frame joined to a press frame from two uprights and a top and a bottom cross-connection, for example for a single press;

several parallel frames together arranged behind one another, each frame formed of two uprights with upper and lower cross-connection, resulting in a press frame composed of at least four uprights or, as in multi-ram presses, of "two plus two times the number of rams" uprights;

several frames arranged in a row, so that a press frame includes arrangements of at least three uprights, which are joined with upper and lower cross-connections. According to at least one embodiment of the present invention, a system of a frame for presses includes structural units with uprights, an upper cross-connection with the head piece and a lower cross-connection with a press table, forming a closed and detachably assembled frame absorbing static and dynamic forces of the presses, wherein a) the uprights can be manufactured with a determinable optimal length and can be laterally or longitudinally joined to the cross-connections by non-positive or force-and form-locking joining geometries/surfaces and releasable connecting means without tie rods, b) the uprights are subjected to tensile stress under an operating force, such as the force of the presses, c) the uprights are designed in such a way that they deform symmetrically under the operating force, which is introduced asymmetrically into the uprights, and d) have different cross-sectional regions corresponding to the acting press forces, so that the press frame has a reduced vertical deflection compared to a press frame joined by tie rod bracing.

According to this system, it should be emphasized that, due to the symmetrical deformability, commensurate with the operating force introduced asymmetrically into the uprights, different cross-sectional regions corresponding to the acting press forces can be created, with the press frame experiencing a reduced vertical deflection.

Compared to the prior art analyzed above, i.e. where the press frames are joined by tie rod bracing, this is new and inventive from a structural and functional point of view, since hitherto the system of the press frame forming the frame included the combination of tie rod stiffness, column stiffness and stiffness of the cross-connections with high deflection, or—with a different perspective— the unfavorable distribution of dynamic loading among conventional tie rods and the uprights according to the prior art required tie rods employing at least a more expensive material.

Commensurate with the object of the invention, namely to construct the press frame having elevated fatigue strength with a reduced elastic vertical deflection while at the same time optimizing the use of materials, in some examples a system of a press frame includes uprights, an upper cross-connection with the head piece and a lower cross-connection with structural units including the press table and that forms a closed and detachably joined frame that absorbs static and dynamic forces of the presses, in which the reduced vertical deflection can be designed according to the relationship $v\mathbf{2} \leq 1/n^{*}v\mathbf{1}$, wherein $n=(s+k)/(s+1)$ and $v\mathbf{1}$=a vertical deflection of a tensioned system under the action of $Fp\mathbf{1}$, $v\mathbf{2}$=the vertical deflection of the system according to the invention under the action of $Fp\mathbf{2}$ n=an advantage factor s=a stiffness ratio, and k=a cost factor.

This system is based on the more complex concept of considering a techno-economic (advantage-) factor composed of a cost factor and a stiffness ratio and investigating its relationship with the deflection behavior, which will be explained in more detail below in connection with the inventive-technical result or the structural and functional relationship.

The following analytical considerations are relevant for realizing the press frame with uprights lacking tie rods in accordance with the invention:

All interacting parts of the press frame undergo a deformation under the pressing force, in particular due to asymmetrical forces acting on the uprights as a result of the bending of the table, ram and head piece, which thus tend to deform in the direction of the tool (center) and form a so-called hourglass effect.

Therefore, when designing a press, the stiffness of the components ram and table that cooperate directly with a tool is specifically dimensioned so as to ensure conventional deflection values of, for example, 0.125 mm/meter mounting surface in the ram and the table. The head piece, on the other hand, is dimensioned for a permissible tension and deforms more than the table. This design results in an asymmetric structure in the press.

With the inventive system, this effect is counteracted by an adapted design of the employed material cross-sections. The uprights exposed to the pressing force can thereby be influenced in such a way that they are deformed less or are deformed more symmetrically than with the classic press design.

With off-center loads, pairs of uprights are unevenly loaded because, for example, higher pressing forces occur on the inlet side than on the outlet side. The uprights on the inlet side deform more than those on the outlet side. Especially with transfer presses, this effect is predetermined in the production process. This asymmetry requires for the tool a correspondingly lengthy start-up associated with increased tool wear, wherein also a ram guide disposed on the uprights, which is specified in parallel with the construction and has a small guide play, is exposed to these loads. The stiffness can be influenced through specific asymmetrical dimensioning of the uprights, thereby counteracting possible adverse effects.

Alternatively, the uprights can also be designed with variable cross-sections by using additional activatable components, such as bracing elements, in order to adapt the stiffness and asymmetrical dimensioning of the press frame to different areas of tool use with correspondingly different requirements.

The aim is also to maintain the ram guide as parallel (symmetrical) as possible with the smallest possible guide play to ensure a high quality of the parts to be produced, such as workpieces, and a long service life of the tools with low wear.

In addition, a possible asymmetrical design of the uprights with an off-center operating force results in a more even load distribution, i.e. more homogeneous stress conditions in the uprights, which results in a higher fatigue strength of the uprights.

The aim is to avoid asymmetrical deformation of the uprights (relative to one another) under the operating force, in particular caused by an off-center operating force. The uprights guide the path of the ram (ram guide) with attached guide strips, in order to counteract an inclined position of the ram, such as tilting, and thus of the upper tool.

The respective system which is characterized by an optimally modified geometric separation of the press frame and without bracing with tie rods can be modified with constructional features and details of a press frame described herein.

This obviates the need for expensive components which result in high costs not only in the procurement, but also in the manufacture, assembly and transportation. Thus, the respective system according to the invention surprisingly no more capital investment compared to conventional constructions by optimizing the sheet metal thickness in the uprights and components of the press frame and the technical effect of less elastic deformation—in particular the vertical deflection. Lower stress amplitudes, which in turn reduce the weld seam stress in the welded components, have an advantageous effect. In addition to the advantageous use of the press, this also results in a longer service life for the welded parts.

Advantageously, with a comparable size of the installation space for the tools and of the functional work areas and with a comparable total use of materials, the external dimensions of the presses as a frame construction without tie rods can be reduced. Furthermore, the size and weight of structural units such as the cross-connections can be limited or reduced, so that technological processing (stress-relieving annealing) and logistical operations using transport systems can be carried out more cost-effectively and in a space-saving manner (cranes, bridges, roads).

The higher overall stiffness of the presses achieved with the invention in the vertical direction (by optimizing the column cross-sections) and also in the horizontal direction, reinforced by the use of transverse and longitudinal traverses, has an advantageous effect on the ram guide, thus dispensing with internal guides in the tool.

Similarly, the play (clearance) of the ram guide can be affected during the effective time of a maximum operating force. In conventional presses, the stress in the columns is relieved during the forming process, with the columns deforming in an undefined direction with an undefined magnitude. In presses without tie rods, the columns tend to move during the forming process due to the tensile load towards the center of the tool and cause a reduction in the guide play, which may make an internal guide in the tool unnecessary.

The press frames without tie rods constructed according to the invention enable various new design options when setting up the press system. By eliminating the anchor nuts on the lower cross-connection, for example, the spring elements of the vibration-isolated installation can be positioned for optimized vibration insulation.

By extending the uprights downward, the concrete foundation supports in the basement can be dispensed with, i.e. the frame is located, vibration-isolated with spring elements, directly on the floor of a press pit foundation.

In some examples, a program step for determining the reduced vertical spring deflection v can be integrated in a computer program for the structural design of a) the uprights to be produced and to be attached to the cross-connections by using non-positive or positive joining geometries and detachable connecting means without tie rod bracing, or
b) the uprights to be subjected to tensile stress under an operating force of the presses, or
c) the press frame to be designed with a reduced vertical deflection.

Some examples include a control and regulating device for the system, which is used to evaluate data of the loads recorded in the system by a corresponding measuring means in a computer and to input data for executing controlling/regulating technical measures relating to the elastic behavior of components of the press frame, in particular for the active bracing of stiffness-relevant cross sections of the uprights by using activatable clamping elements.

DETAILED DESCRIPTION OF THE INVENTION

Figure 1A:
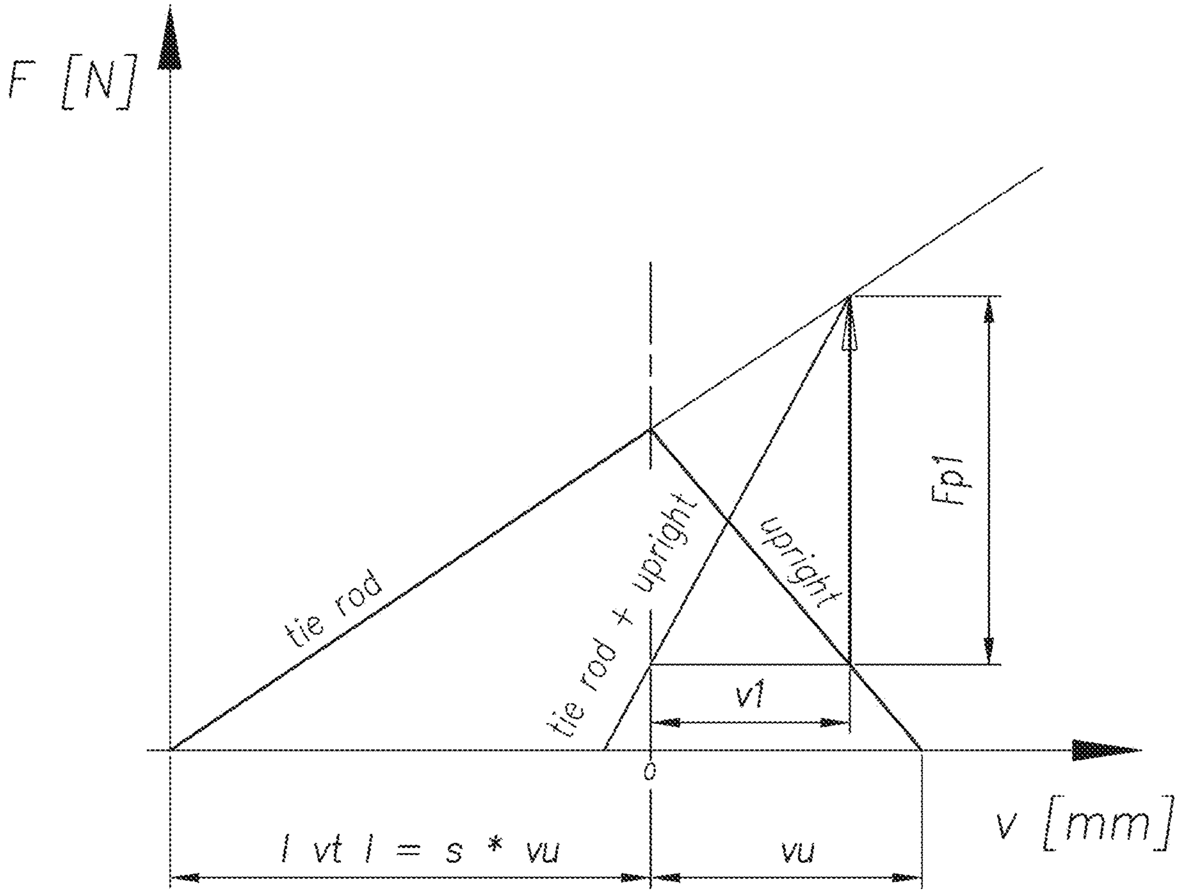
FIG. 1*a* shows a force/deformation diagram (tension diagram) illustrating the elastic changes in shape and dynamic loads of connected tie rods and uprights.
Figure 3:
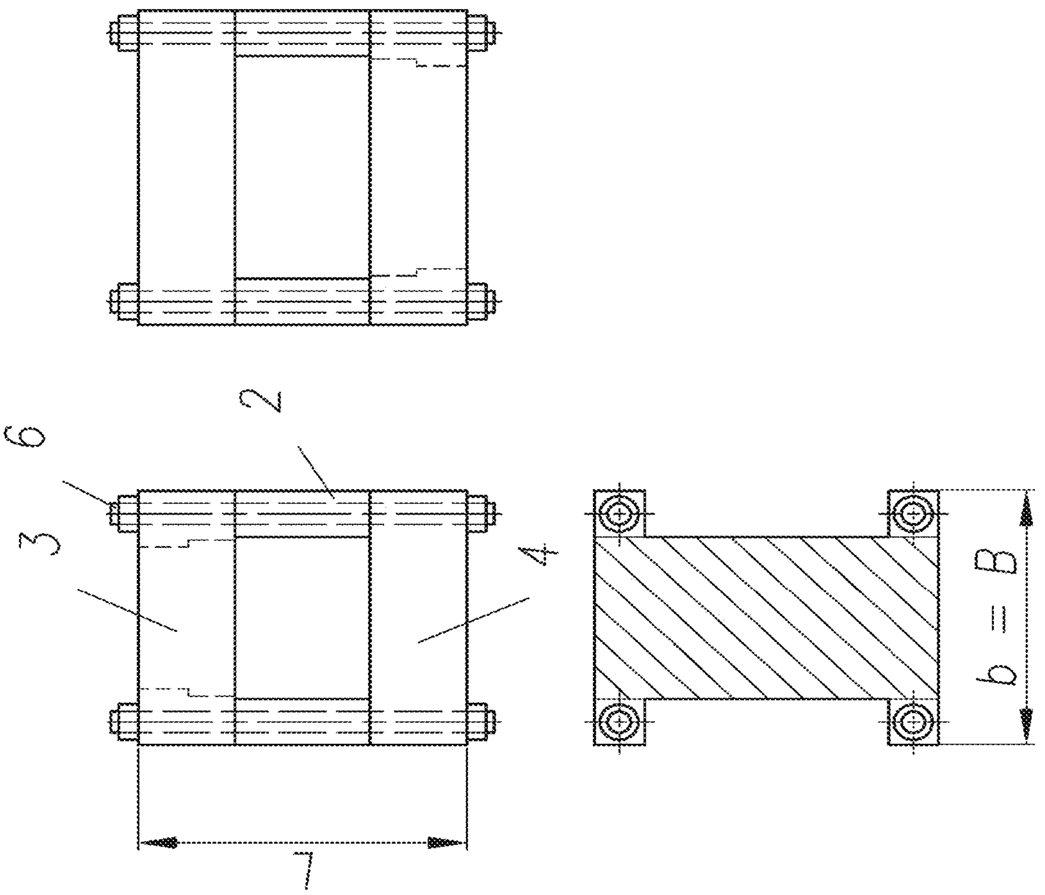
FIG. 3 shows a press frame according to the prior art.

For clarification the inventive systems compared with the prior art analyzed above, FIG. 1*a* shows firstly a diagram of the elastic behavior of a conventionally tie-rod-braced press frame 1 according to FIG. 3, from which an unillustrated overall stiffness can be derived, which causes a vertical deflection v1. The diagram corresponds to a classic screw tension diagram and shows the operative connection of a pre-tensioned screw, referred to here as tie rod analogous to a tie rod 6 (FIG. 3) in the press frame 1. This is intended to illustrate to a person skilled in the art (using the example of the press force distribution on four uprights) the distribution of the dynamic load onto conventional tie rods 6 and uprights 2.

The designations in the diagram are as follows:

F=force in N

Fp1=pressing force v=deflection in mm (according to DIN 55189 as elastic vertical deflection velz=elastic displacement in z-direction)

v1=vertical deflection of the tensioned system under the action of Fp1 vt=deflection tie rod due to preload vu=deflection upright due to preload s=stiffness ratio of column to tie rod This is based on the stiffness ratio s of the upright 2 (upright) and the tie rods 6 (tie rod) of, for example, 1.5:1, which is customary in press technology. Thus, the tie rods 6 experience the dynamic load proportion and the uprights 2 experience the dynamic load proportion corresponding to this stiffness ratio s. With a conventional preload of, for example, 1.3×pressing force Fp1, the spring deflection v1 can be deduced.

The diagram illustrates the unfavorable conventional distribution of the dynamic load on conventional tie rods and uprights because the tie rod, which was previously made of higher quality material, absorbs a lower dynamic load than the upright. The 1.5:1 stiffness ratio s of upright 2 to tie rod 6 causes a dynamic load distribution of 1.5:1 and thus prevents an optimized load distribution for the uprights. To increase stiffness, the tie rods 6 are therefore constructed of a more expensive/higher-load-bearing material than the uprights 2.

The preload achieved with the tie rods 6 has the disadvantage that, with an unchanged pressing force Fp1 and with an unchanged specified deflection v1, only a so-called residual clamping force is increased. If a higher pressing force Fp1 is required, a correspondingly higher deflection v1 must be accepted, which, for example, adversely affects the forming process.

Depending on the design, cavities/through holes are provided in uprights and cross-connections, such as the head piece and press table, and adequately dimensioned contact surfaces for the anchor nuts are provided on the head piece and the press table. A reinforcement/enlargement of the diameter of the tie rods would likewise result in an enlargement of the upright and/or of the external dimensions of the system, which due to the material consumption disadvantageously increases the financial outlay to be invested.

Figure 2:
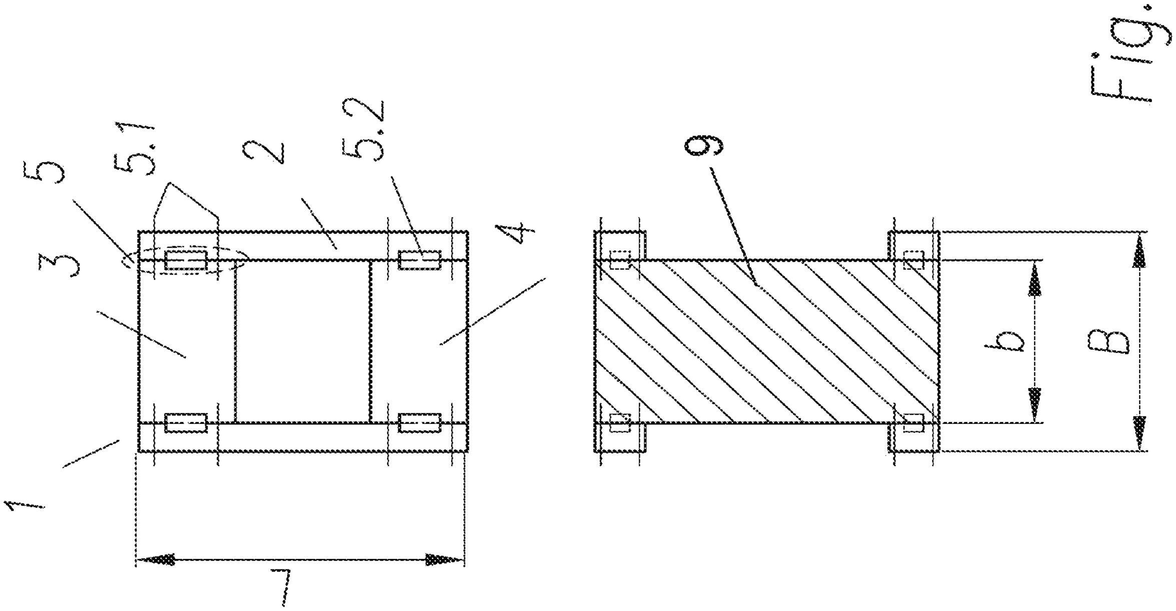
FIG. 2 shows the structural principle of the press frame according to the invention corresponding to FIG. 1*b*) without tie rods, illustrating a smaller transport dimension b compared to a conventional design shown in FIG. 3.
Figure 5:
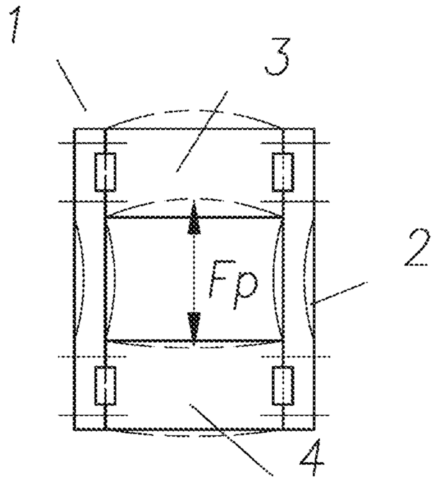
FIG. 5 shows a deformation scheme (hourglass effect)
Figure 6:
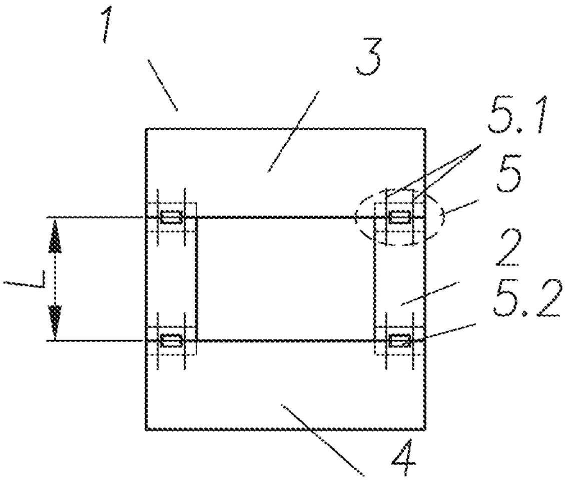
FIG. 6 shows an embodiment of the press frame according to the invention with longitudinally attached uprights.

This development trend is, on the other hand, contravened by the system according to the invention of a frame for presses according to FIG. 2, FIG. 5 or FIG. 6, which includes as a press frame 1 structural units with uprights 2, an upper cross-connection with a head piece 3 and a lower cross-connection 4 with a press table and forms a closed and releasably joined frame that absorbs static and dynamic forces of the presses, and which is designed in such a way that a) the uprights 2 with a length L are manufactured as a structural unit and are joined laterally or longitudinally to the cross-connections 3, 4 by way of non-positive or non-positive and positive joining geometries 5 and releasable connecting means 5.1 without tie rods, b) the uprights 2 are designed to be subjected to tension with an operating force Fp, and c) the press frame 1 has a reduced vertical deflection v2 compared to a press frame (1) joined by way of tie rod bracing 6.

This system is based on more complex detailed considerations, according to which a relation of a factor n=(s+k)/(s+1) was created, which is based on a a cost factor k=price per kilo of tie rod/price per kilo of upright (in practice k>2), and the stiffness ratio s=column stiffness/tie rod stiffness (in practice s=1.5).

Figure 1B:
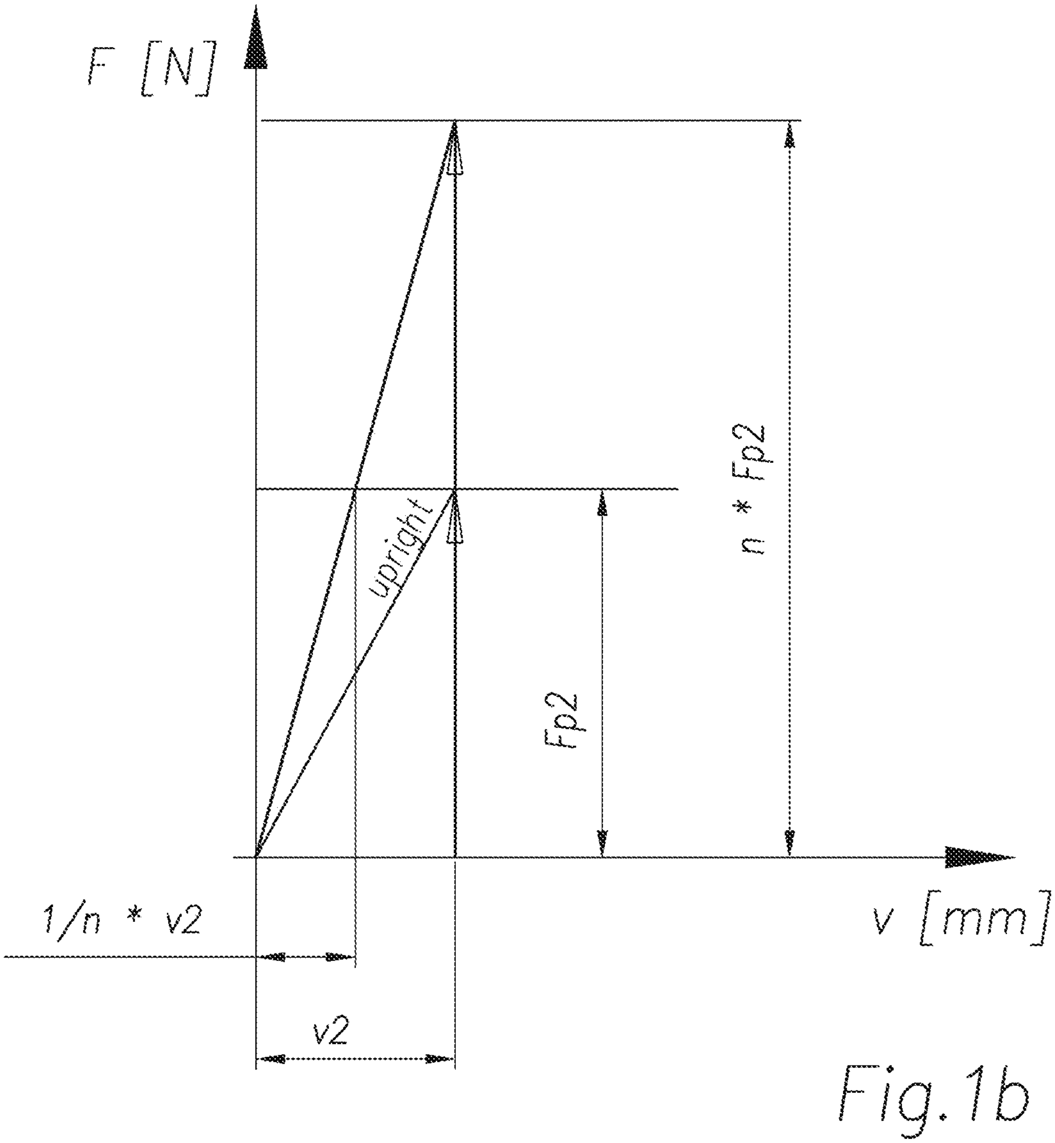
FIG. 1*b* shows a force/deformation diagram illustrating the elastic change in the shape and thus the dynamic load in the upright without tie rods.

From this combined consideration which merges economic and technical issues of these characteristic parameters “k” and “s” and with the same financial investment as for the conventional design, the diagram according to FIG. 1*b* illustrates the reduced vertical spring deflection v2≤1/n*v1, where n=(s+k)/(s+1) applies, and in this case, the increased operating force of Fp2=n*Fp1, according to the invention, wherein, for example, k=2 and s=1.5 allow 1.4 times the stiffness (or 1/1.4 times the deflection) or 1.4 times the operating force.

In the diagram denote (in comparison to FIG. 1*a*):

F=force in N

Fp2=pressing force in the press frame according to the invention v=deflection in mm (according to DIN 55189 as elastic vertical deflection velz=elastic displacement in z-direction)

v2=vertical deflection under the action of Fp2 s=stiffness ratio.

FIG. 1*b* illustrates in this way the dynamic load distribution on the uprights according to the inventive system without the use of tie-rods with an unexpected deflection v2, which forms the basis for realizing the new and advantageous constructive configurations in the press frame, enabling the absorption of the entire dynamic load caused by the press force Fp2 by the uprights 2.

FIG. 2 illustrates schematically the construction similar to FIG. 1*b*) of the inventive press frame 1 with the advantageous overall height L of the upright 2, an upper cross-connection such as head piece 3, a lower cross-connection such as press table 4, joining geometries 5, releasable connecting means 5.1 and joining means 5.2, as well as with an advantages exemplary smaller transport dimension b relevant to the invention relative to final structural unit dimension B.

Conversely, FIG. 3 shows schematically a conventional design with the height L of the upright 2, with the tie rods 6 that disadvantageously protrude from this height and brace the upright 2 as well as the upper cross-connection such as the head piece 3 and the lower cross-connection such as the press table 4, and with a disadvantageous transport dimension b that equals the final structural unit dimension B.

This system of a frame for presses is completed in the press frame 1 with the following features, either alone or in combination:

a design of the uprights 2 counteracting different types of bending tendencies of the upper 3 and lower cross-connection 4;

an asymmetrical design of the uprights 2 in such a way that they deform symmetrically with respect to each other under an asymmetrically introduced operating force, especially when using double uprights in multi-ram presses (compact suction presses, step presses), wherein the respective rams are loaded differently by different press forces;

a targeted dimensioning of the cross-sections of the uprights 2 by adapting cross-sectional regions commensurate with the acting pressing forces;

an embodiment creating stiffness relevant cross-sections in the uprights 2 by active bracing to obtain an additional cross section for increasing the stiffness equal to the inner or outer cross-section;

a design of the uprights 2 and cross-connections 3, 4 by way of connecting non-positive and positive joining geometries 5, joining means 5.2 and releasable connection means 5.1 including an overload protection commensurate with the acting pressing forces;

the frame receiving the cross-connections 3, 4 with the uprights 2 and the joining geometries 5 and connected to the press frame 1, which absorbs changes in shape and the entirety of the stresses and changes in shape of the operation of a press without tie rod bracing, which has at least one structural unit or transport unit for accommodating functional structural units 7 of the press in the transport or operating state;

a permanent dimensioning or design of least one of the uprights 2, in particular asymmetrically to one of the other uprights 2, for a) taking into account off-center operating forces of the press and preventing component damage, b) counteracting disadvantageous elastic changes in shape or changes in the play of a ram guide, or c) optimizing multi-ram presses;

a sectional implementation of at least one is typical cross section of the upright 2 in an open or closed and/or asymmetric form;

an implementation of at least one of the uprights 2 so that parts of a drive, such as an axle bolt, in the corresponding head piece 3 can be arranged in the region of the upright 2 with a corresponding open cross-section or with a similar assembly opening to reduce the length of the head piece 2 or of the press;

formation of least one overload protection means by the joint geometry 5 or the joining means 5.2, or the connecting means (5.1).

The particular design features or properties are realized or characterized in the press frame 1 by the following features, either individually or in combination:

To protect the press frame 1 from overload and as predetermined break connections, overload protection means constructed, for example, as shear bolts, hydraulic elements or as pre-tensioned mechanical springs, elastic form-fitting connections or form-fitting cylindrical connections, which yield when a maximum pressing force Fp is exceeded, can be arranged in the uprights 2 or between the uprights 2 and the cross-connections 3, 4.

The positive or non-positive joining geometries 5 or releasable connecting means 5.1 are designed as a) elements having predetermined breaks, b) elastic connections, c) hydraulically biased spring elements, d) mechanically biased spring elements, e) friction-type elements.

The press frame 1 has an advantageous force flow that acts positively on the deformation and local stress conditions of the press and depends the position and shape of the joining geometries 5 and connecting means 5.1.

The press frame 1 has a design that counteracts the deflection of the cross-connections 3, 4 by way of broad-crowned feather keys, or dovetail connections, also with a one-sided bevel, or single- or multi-part wedges and feather keys.

The press frame 1 has connecting means 5.1 which automatically adjust its preloading force to compensate for run-in and settlement phenomena in the connection, such as joining geometry 5, by way of at least one spring-actuated conical clamping system, or hydraulic clamping system, or spring-loaded single or multi-part wedge system, or weight-tensioned system.

The press frame 1 is formed with structurally differently designed uprights 2 at the inlet side and the outlet side of the press or the press stage so as to suitably counteract the different stage forces, even having phase-offsets, and to reduce the tendency of (asymmetric) overall deformation of the press frame 1 under an operating force.

The press frame 1 lacks a tool-internal guide due to reduced ram guide play, especially in the effective range of the max. operating force.

To prevent fretting corrosion, the press frame 1 has in the joining geometries 5 sliding elements used locally or over a large area for the targeted generation of relative movements between the uprights 2 and cross-connections 3. 4.

Furthermore, according to the invention, this press frame 1 can be designed with the following special features:

Adjacent upright 2 are in each case provided with traverses (longitudinal, transverse and diagonal) to increase the overall stiffness of the press frame 1.

At least one functional structural unit 7 can be implemented as a transverse and longitudinal traverse by way of a drive unit for automation, or a fluid unit including installation, or a sensory part/workpiece monitoring, or a light barrier, or a lighting system.

In the releasable connecting means 5.1, the axially mounted axle bolts and components are securely mounted to prevent detachment.

If desired, at least one hydraulic, electromotive, pneumatic, thermal or sensory activatable clamping element is operatively connected to functions or facilities, such as for overload protection or to ram counterbalancing.

Figure 8:
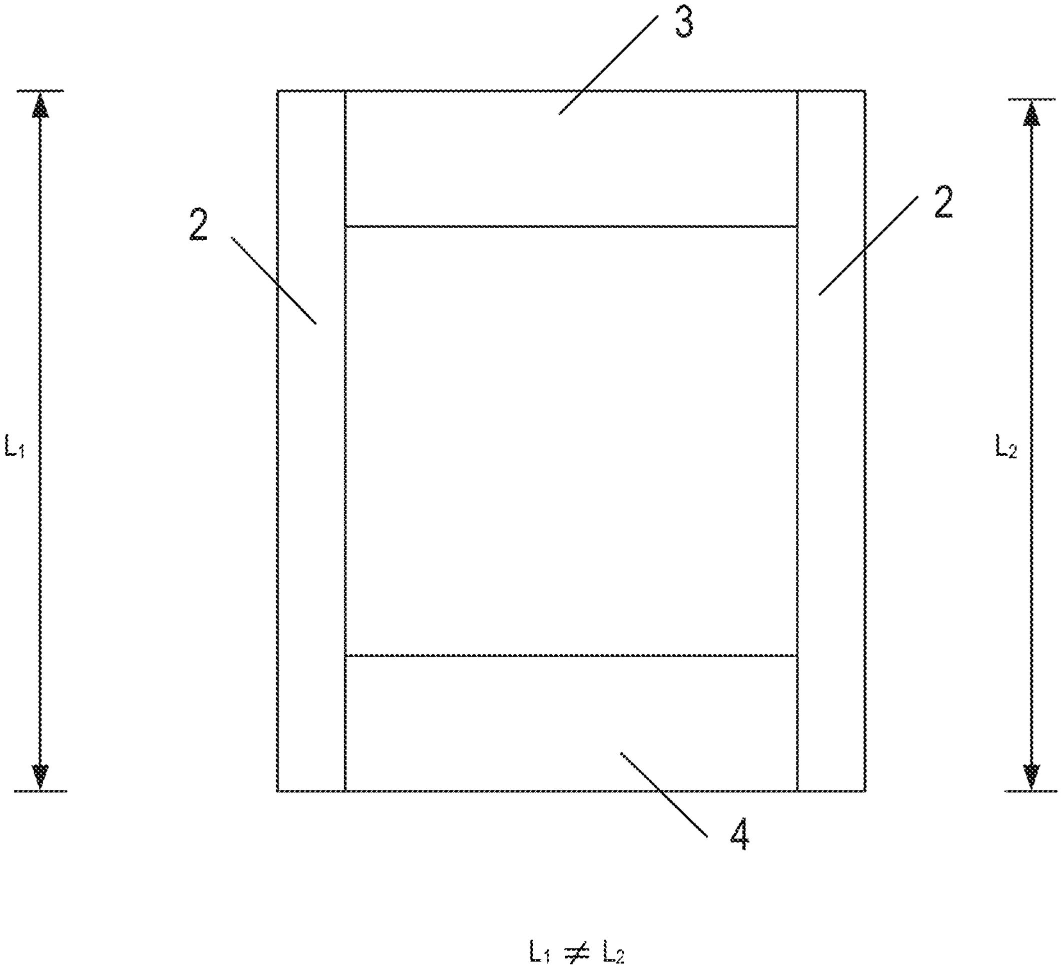
FIG. 8 shows another example of a press frame according to at least one embodiment of the present invention.

Only with the inventive system can the press frame 1 advantageously be constructed as a releasably joined frame, due to the uprights 2 having mutually different lengths $L_1$, $L_2$, as shown in FIG. 8, and/or by upper and lower cross-connections 3, 4 having mutually different widths b.

This makes it possible, provided that the uprights 2 with the length L laterally or longitudinally can be joined with the cross-connections 3, 4 by way of non-positive or non-positive and positive joining geometries 5 and releasable connecting means 5.1 in abutment without tie rod bracing, to employ for special cases and/or different press genres, types, and arrangements, for example in multi-ram presses, press lines, multi-stage presses, transfer presses, within a single frame, mutually different lengths of uprights 2 and upper and lower cross-connections 3, 4, and in the regions of the joining geometries mutually different lateral or longitudinal joining types, with parallel and sequentially arranged frames, from frame-to-frame different lengths of uprights 2 and upper and lower cross-connections 3, 4 and different lateral or longitudinal joining types, or with sequentially arranged frames, from frame-to-frame different lengths of uprights 2 and upper and lower cross-connections 3, 4 and different lateral or longitudinal joining types, while retaining values of a stress state, force flow, and stiffness required according to the invention with reduced vertical deflection v2. In this way, any on-site conditions of a press operator can be met by adapting each press frame through various configurations of lateral or longitudinal joining types, different lengths or widths of the uprights or the upper and lower cross-connections.

The press frame 1 can advantageously be also designed with a smaller transport dimension b, compared to a final structural unit dimension B of the press, for a temporary transport unit 9 that includes the modules upper or lower cross-connections 3, 4, or with a downward extension of the uprights 2 instead of foundation supports made of concrete, or with a receptacle formed in at least one upright 2 for at least one of the functional structural units of the presses, such as Drive unit of a so-called automation system together with accessories, Traverse for lighting and optical surveillance, Oil tank, air tank, tool lubrication/drawing agent, Hydraulic lines, cooling line and power cable for servo drive, Control/regulation/switch box, Control panels, other operating elements, Service box for manual auxiliary devices, cleaning devices, flashlights, tools, compressed air, Accessories for other sensors, Vibration damping elements, as a temporary transport unit or for a press operation.

The usable cavities created by virtue of the elimination of the tie rods, allow vibration-damping materials, such as granulate and sand, to be embedded in the uprights 2.

In addition, the elimination of the tie rods together with anchor bolts allows more constructive freedom in design/location of the mounting surfaces of the press table, so that a vibration-isolating installation (spring elements) can be optimally placed and dimensioned, due to the elimination of previously necessary costly and time-consuming tightening of the anchor nuts for final structural unit at the site of the operator using a clamping device, which must be transported back and forth.

At a comparable and required deflection v, this means that the upright 2 assumes a stiffness that corresponds at least to the overall stiffness of the tensioned system according to FIG. 1*a*.

Thus, the load-bearing walls of the uprights 2 can be reinforced inwardly by using thicker metal sheets up to and including a design representing a solid stand.

Figure 7A:
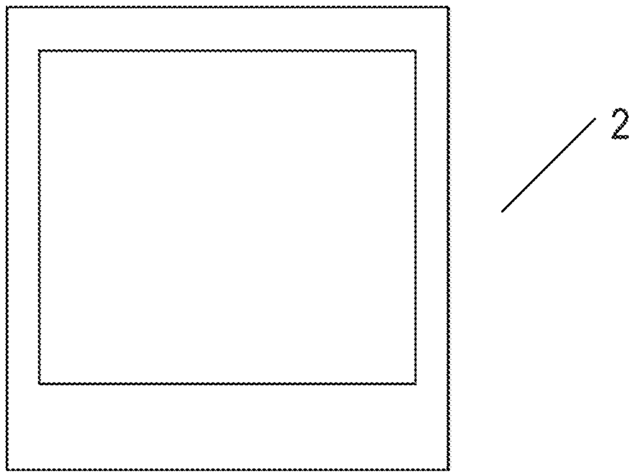
FIG. 7*a* shows an example cross-section of an upright in accordance with aspects of the present invention.
Figure 7B:
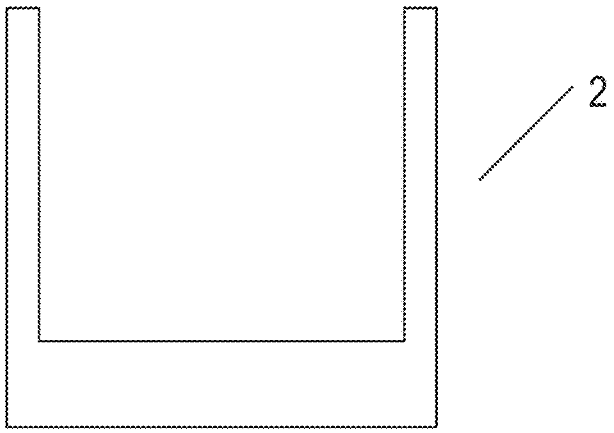
FIG. 7*b* shows another example cross-section of an upright in accordance with aspects of the present invention.
Figure 7C:
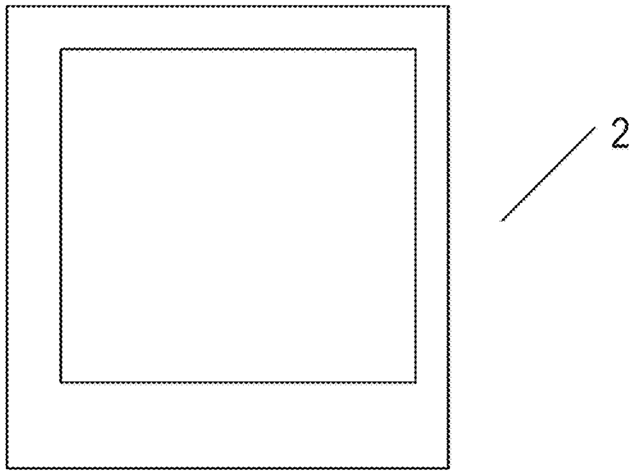
FIG. 7*c* shows another example cross-section of an upright in accordance with aspects of the present invention.

The typical cross section of the uprights 2 may be designed to have a partially open or closed, symmetrical or asymmetrical shape so as to specifically affect the deformation of the upright 2 or accommodate the functional structural units 7 in a space-optimized manner. FIG. 7*a* illustrates an example cross section of an upright 2 having a closed shape with respect to the walls (sheets) of the upright 2. FIG. 7*b* illustrates an example cross section of an upright 2 having an open shape with respect to the walls (sheets) of the upright 2. FIG. 7*c* illustrates an example cross section of the upright 2 having an asymmetrical shape with respect to the walls (sheets) of the upright 2, where the shape is asymmetrical in that there is no line of symmetry.

The play of the ram guide on the press is specifically influenced by designing the stiffness of certain sections in the uprights 2 such that advantageously a small play can be set during or shortly before the forming process.

When a non-uniform/asymmetrical distribution of the pressing force is required due to the use of special multi-stage tools or with multi-ram presses, the uprights 2 may thereafter be differently dimensioned corresponding to the load distribution.

Figure 4:
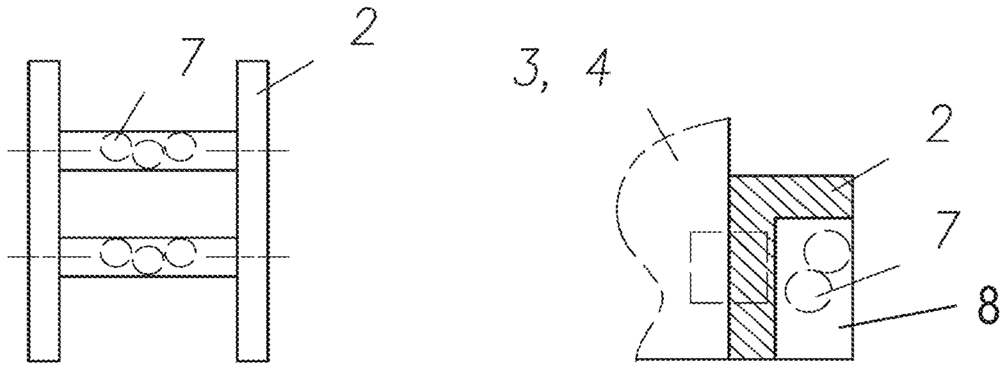
FIG. 4 shows details relating to joining geometries/surfaces and releasable connecting means as well as insertion of functional structural units.

Empty cavities 8 in the uprights 2 can be used for other purposes, in order to implement, in accordance with FIG. 4, functional structural units 7, such as for example, additional units, control elements, memory in a space-saving manner or vibration-damping materials.

Functional structural units 7 of the press automation can be integrated between two uprights 2 as a supporting/stiffening part of the press frame 1. At the same time, a three-part unit as a preassembled structural unit would make assembly work easier for the operator.

The time and money required to assemble and transport a press plant could be reduced; costly hydraulic auxiliary devices for the previously required clamping by way of tie rods 6 and anchor nuts are eliminated.

The reduced spatial requirements for production halls and operator buildings lead to significant cost reductions.

According to the invention, to refine the design, a program step for the determination of the reduced vertical deflection v2 according to the relationship $v2 \leq 1/n * v1$ can be integrated in a computer program for constructing a) the uprights 2 to be produced with a length L and attached to the cross-connections 3, 4 laterally or longitudinally by way of non-positive or non-positive and positive joining geometries 5 and releasable connecting means 5.1 without tie rod bracing 6, or b) the upright 2 to be subjected to tension under an operating force Fp of the presses, or c) the press frame 1 to be designed with a reduced vertical deflection v2, wherein $n=(s+k)/(s+1)$ and v1=a vertical deflection of a tensioned system under the action of Fp1, v2=the vertical deflection of the system according to the invention under the action of Fp2, n=an advantage factor, s=a stiffness ratio, and k=a cost factor.

A control and regulating device for the system according to the invention of a frame for presses includes a) at least one corresponding measuring means, preferably strain gauges, in the system for receiving data pertaining to static and dynamic forces of the press concerning the loads in units that include the upright 2, upper cross-connection and lower cross-connection 3, 4, b) Evaluation of these data in a computer, and c) Outputting data pertaining to static and dynamic forces of the press for control/regulating measures for the elastic behavior of structural units of the press frame 1, so as to enable a load-dependent controlled/regulated variable adaptation of the stiffness of the press frame 1 for the active bracing of stiffness-relevant cross-sections of the uprights 2 by means of the above-mentioned activatable bracing elements.

The scope of the invention includes the targeted use of less expensive materials that can be processed very easily in terms of welding technology and are available worldwide.

The maximum weight and dimensions of the individual components produced according to the invention up to an entire press system in a press plant can be reduced.

The system according to the invention with the targeted change in the stiffness of the press frames by eliminating the vertical preloading makes the application of the presses more flexible or expands of their field of application.

The change in the stiffness of the uprights by activating, deactivating or changing additional tensionable cross-sections of the uprights allows the press frame to be optimally adapted to the tool to be used, e.g. increased upright stiffness for cutting tools, a reduced, minimum required stiffness for forming tools in order to achieve longer service lives of guides and other wear parts.

The selective use of material in determinable cross-sectional areas of the uprights to increase their stiffness increases the use-value for the press operator, both when the processing of high strength parts and also with respect to the critical cutting stroke when using cutting tools.

Elimination or reduction of the guide rods in the tool results in a structural simplification of the employed tools, which enables a more favorable workpiece transport and reduces tool costs.

LIST OF REFERENCE SYMBOLS

1 press frame
2 uprights with height (=length) L
3 upper cross-connection, head piece
4 lower cross-connection, press table
4.1 joining geometry
4.2 detachable fasteners
4.3 joining agents
6 tie rods
7 functional structural unit
b width, transport dimensions
B final structural unit dimension, external dimension
L height of the upright (=length of the unit)
F force in N
Fp1 pressing force
Fp2 pressing force
v deflection in mm
v1 vertical deflection of the tensioned system under the action of Fp1
v2 vertical deflection of the system according to the invention under the action of Fp2
vt deflection tie rod due to preload
vu deflection upright due to preload
s stiffness ratio of upright to tie rod
n advantage factor
k cost factor

The invention claimed is:

1. A system of a frame for presses, comprising a press frame (1) having structural units constructed as at least two uprights (2), an upper cross connection with a head piece (3), and a lower cross connection (4) with a press table (4), the frame (1) forming a closed and releasably joined frame that receives static and dynamic forces of the presses, wherein a) the at least two uprights (2) each having a respective length (L) are manufactured as a structural unit and joined in abutment laterally or longitudinally to the cross-connections (3, 4) by way of non-positive joining geometries or non-positive and positive joining geometries (5) and releasable connectors (5.1) without tie rods, b) the at least two uprights (2) are subjected to tensile stress under an operating force (Fp) of the presses, and c) at least one of the two uprights (2) has a structure designed different from that of the other one of the uprights such that it deforms symmetrically under the operating force introduced asymmetrically into the uprights (2), and has cross-sectional regions differentiated commensurate with acting press forces such that at least one cross section of the upright (2) is constructed in sections in an open or closed and/or asymmetrical shape.

2. The system of a frame for presses according to claim 1, wherein in accordance with the relationship v2≤1/n*v1, and wherein n= (s+k)/(s+1), and v1=a vertical deflection of a tensioned system under the action of a pressing force Fp1, v2=the vertical deflection of the system under the action of a pressing force Fp2, n=an advantage factor, S=a stiffness ratio, and k=a cost factor.

3. The system of the frame for presses according to claim 1, wherein the uprights (2) are structurally designed to counteract a different type of bending tendency originating from the upper cross connection (3) or the lower cross connection (4).

4. The system of the frame for presses according to claim 1, wherein the non-positive and positive joining geometries (5), joiners (5.2) and the releasable connectors (5.1) connecting the uprights (2) and the cross connections (3, 4) are designed commensurate with the acting pressing forces and include an overload protection.

5. The system of a frame for presses according to claim 1, wherein the frame receiving the cross connections (3, 4) with the uprights (2) and the joining geometries (5) connected to form the press frame (1) and subjected to shape changes and all the stresses and changes in shape of an operation of a press without tie rod bracing has at least one structural unit or transport unit for receiving functional structural units (7) of the press in a transport or operating state.

6. The system of a frame for presses according to claim 1, wherein at least one of the uprights (2) is permanently dimensioned or designed asymmetrical in relation to the other one of the uprights (2), while a) taking into account off-center operating forces of the presses and avoiding component damage, b) counteracting disadvantageous elastic changes in shape or changes in play in a ram guide, or c) optimizing multi-ram presses.

7. The system of a frame for presses according to claim 1, wherein at least one of the uprights (2) is constructed such that an axle bolt is placed in the associated head piece (3) in the region of the upright (2) having a suitable open cross-section or similar mounting opening for reducing the length of the head piece (3) or the press.

8. The system of a frame for presses according to claim 4, wherein the overload protection is provided by yielding when a maximum pressing force (Fp) is exceeded.

9. The system of a frame for presses according to claim 1, wherein the non-positive or non-positive and positive joining geometries (5) or releasable connectors (5.1) are formed as predetermined break elements, elastic connections, hydraulically preloaded spring elements, mechanically preloaded spring elements or frictional elements.

10. The system of a frame for presses according to claim 1, wherein the connectors (5.1) automatically adjust a preloading force to compensate for run-in and settlement phenomena in a connection by joining geometry (5), by way of at least one of spring-actuated conical clamping system, or
hydraulic clamping system, or
spring-loaded single or multi-part wedge system, or
weight-tensioned system.

11. The system of a frame for presses according to claim 1, wherein the press frame has the structurally differently designed uprights (2) at an inlet side and an outlet side of the press or press stage to counteract different stage forces, even having phase-offsets, and to reduce the tendency of overall deformation of the press frame (1) under the operating force.

12. The system of a frame for presses according to claim 1, wherein the press frame has a design without a tool-internal guide due to reduced ram guide play, including in an effective range of a maximum operating force.

13. The system of a frame for presses according to claim 1, further comprising traverses connecting adjacent uprights (2) to increase the overall stiffness of the press frame (1).

14. The system of a frame for presses according to claim 1, further comprising a cross and longitudinal traverse implemented as a functional structural unit (7) comprising one of a drive unit for automation, or
a fluid unit including installation, or
a sensory part/workpiece monitoring, or
a light barrier, or
a lighting system.

15. The system of a frame for presses according to claim 1, wherein the upper and lower cross connections (3, 4) of the uprights (2) are braced by at least one clamping element activatable for variable adjustment of the stiffness of the press frame (1).

16. The system of a frame for presses according to claim 1, wherein the releasably joined frame comprises the uprights (2) having a mutually different length (L) and/or the upper and lower cross connections (3, 4) having a mutually different width (b).

17. The system of a frame for presses according to claim 1, wherein a transport dimension (b) of a temporary transport unit (9) comprising structural units of the upper or lower cross connections (3, 4) is smaller compared to a final structural unit dimension (B) of the press.

18. The system of a frame for presses according to claim 1, wherein a cavity formed in at least one of the uprights (2) receives at least one of the following functional structural units (7) of the presses;

drive unit of an automation system together with accessories,
traverse for lighting and optical surveillance,
oil tank, air tank, tool lubrication/drawing agent,
hydraulic lines, cooling line and power cable for servo drive,
control/regulation/switch box,
control panels, other operating elements,
service box for manual auxiliary devices, cleaning devices, flashlights, tools, compressed air,
accessories for other sensors,
vibration damping elements.

19. The system of a frame for presses according to claim 15, further comprising clamping elements operatively as overload protection or counterbalancing ram weight.

20. The system of a frame for presses according to claim 1, wherein the uprights (2) are structurally designed so as to deform mutually symmetrically under an operating force introduced asymmetrically in the uprights (2) when using of dual uprights in multi-ram presses, namely when loaded differently by different pressing forces of the respective rams.

21. The system of a frame for presses according to claim 1, comprising an extension of the uprights (2) downwards instead of concrete foundation supports.

22. A computer program for the system of a frame for presses according to claim 1 for structural design of a) the uprights (2) to be produced each with a respective length (L) and attached to the cross connections (3, 4) laterally or longitudinally by way of the non-positive or non-positive and positive joining geometries (5) and the releasable connector (5.1) without tie rod bracing (6), or
b) the upright (2) to be subjected to tension under an operating force (Fp) of the presses, or
c) the press frame (1) to be designed with a reduced vertical deflection (v2), wherein the integration of a program step for determining the reduced vertical deflection (v2) according to the relationship v2≤1/n*v1, wherein n= (s+k)/(s+1) and
v1=a vertical deflection of a tensioned system under the action of a pressing force Fp1,
v2=the vertical deflection of the system under the action of a pressing Fp2,
n=an advantage factor,
S=a stiffness ratio, and
k=a cost factor.

23. A control and regulating device for the system of a frame for presses according to claim 1, which comprises the press frame (1) having the structural units with the uprights (2), the upper cross connection with the head piece (3) and the lower cross connection (4) with the press table (4), and the closed and releasably joined frame absorbing static and dynamic forces of the presses, wherein a) at least one measuring device, such as a strain gauge, corresponding in the system for receiving data relating to static and dynamic forces of the press of the loads in the structural units comprising the press frame (1), the uprights (2), the upper cross connection (3) and the lower cross connection (4),
b) evaluation of this data in a computer; and
c) outputting data pertaining to static and dynamic forces of the press for control/regulating measures for elastic behavior of the structural units of the press frame (1);
wherein a load-dependent controlled/regulated variable adjustment of a stiffness of the press frame (1) for an active bracing of stiffness-relevant cross sections of the uprights (2) by way of activatable clamping elements.

* * * * *